United States Patent
Poduska et al.

(10) Patent No.: US 11,025,284 B1
(45) Date of Patent: Jun. 1, 2021

(54) SYSTEMS AND METHODS FOR IMPLEMENTING USER APPLICATIONS IN SOFTWARE-DEFINED RADIO DEVICES

(71) Applicant: Rockwell Collins, Inc., Cedar Rapids, IA (US)

(72) Inventors: Matthew J. Poduska, Mount Vernon, IA (US); Ryan J. Coppa, Cedar Rapids, IA (US); Sarah Miller, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 93 days.

(21) Appl. No.: 16/008,923

(22) Filed: Jun. 14, 2018

(51) Int. Cl.
| | |
|---|---|
| *H04B 1/00* | (2006.01) |
| *G06F 9/54* | (2006.01) |
| *H04B 1/40* | (2015.01) |
| *G06F 8/30* | (2018.01) |

(52) U.S. Cl.
CPC ............ *H04B 1/0007* (2013.01); *G06F 9/54* (2013.01); *H04B 1/40* (2013.01); *G06F 8/30* (2013.01)

(58) Field of Classification Search
CPC .......... H04B 1/0007; H04B 1/40; G06F 9/54; G06F 8/30
See application file for complete search history.

(56) References Cited

U.S. PATENT DOCUMENTS

| | | | | |
|---|---|---|---|---|
| 7,720,506 B1* | 5/2010 | Gribble | ............. | H04B 7/18506 455/132 |
| 7,831,255 B1* | 11/2010 | Gribble | ............... | H04B 17/354 370/329 |
| 9,369,775 B2* | 6/2016 | Roman | ............. | H04B 7/18578 |
| 9,831,899 B1* | 11/2017 | Boghrat | ................. | H03F 3/245 |
| 10,009,956 B1* | 6/2018 | Feher | ..................... | H04W 4/02 |
| 2001/0030612 A1* | 10/2001 | Kerber | .................... | G08B 5/36 340/12.22 |
| 2002/0186845 A1* | 12/2002 | Dutta | .................... | G06Q 20/32 380/247 |
| 2003/0054842 A1* | 3/2003 | Riedl | .................. | H04L 27/3483 455/462 |
| 2003/0189641 A1* | 10/2003 | Skalina | .................. | H04N 17/00 348/192 |
| 2004/0242261 A1* | 12/2004 | Fette | .................... | H04B 1/0003 455/550.1 |
| 2005/0046887 A1* | 3/2005 | Shibata | ............. | H04N 1/00204 358/1.13 |
| 2005/0074019 A1* | 4/2005 | Handforth | ............... | H04L 12/44 370/406 |

(Continued)

*Primary Examiner* — Diane D Mizrahi
(74) *Attorney, Agent, or Firm* — Suiter Swantz pc llo (57) ABSTRACT

A radio device includes a hardware antenna, an analog-to-digital converter, and a processing circuit. The hardware antenna is configured to receive an analog signal corresponding to a radio frequency waveform. The analog-to-digital converter is configured to convert the analog signal to a digital signal corresponding to the radio frequency waveform. The processing circuit is configured to provide the digital signal corresponding to the radio frequency waveform to a first application; execute the first application using the digital signal to generate a first output instruction; execute an application programming interface to convert the first output instruction to a second output instruction; and execute the second output instruction.

14 Claims, 4 Drawing Sheets

(56) References Cited

U.S. PATENT DOCUMENTS

| | | | | |
|---|---|---|---|---|
| 2005/0108382 A1* | 5/2005 | Murotake | H04L 41/0233 | 709/223 |
| 2005/0111363 A1* | 5/2005 | Snelgrove | H04M 3/42153 | 370/230 |
| 2005/0246137 A1* | 11/2005 | Brinkman | G01V 1/003 | 702/188 |
| 2006/0009911 A1* | 1/2006 | Burkholder | G01V 1/003 | 702/18 |
| 2006/0183421 A1* | 8/2006 | Proctor, Jr. | H04B 7/15521 | 455/11.1 |
| 2007/0190994 A1* | 8/2007 | Sakai | H04B 1/0003 | 455/418 |
| 2008/0129615 A1* | 6/2008 | Breit | G01R 29/105 | 343/703 |
| 2008/0309555 A1* | 12/2008 | Fan | H04B 17/26 | 342/372 |
| 2009/0086692 A1* | 4/2009 | Chen | H04L 67/10 | 370/338 |
| 2009/0254901 A1* | 10/2009 | King | G06F 1/3203 | 718/1 |
| 2010/0015910 A1* | 1/2010 | Hensley | H04K 3/226 | 455/1 |
| 2010/0064154 A1* | 3/2010 | King | H04W 52/0251 | 713/320 |
| 2010/0328047 A1* | 12/2010 | Jantunen | G06K 7/0008 | 340/10.4 |
| 2012/0096185 A1* | 4/2012 | Naparstek | H04L 41/145 | 709/246 |
| 2013/0139146 A1* | 5/2013 | Bickle | G06F 16/84 | 717/174 |
| 2013/0187674 A1* | 7/2013 | Rada | G01R 35/005 | 324/750.02 |
| 2015/0223060 A1* | 8/2015 | Chiang | H04W 92/12 | 380/247 |
| 2015/0323905 A1* | 11/2015 | May | G04G 9/0076 | 368/21 |
| 2016/0037434 A1* | 2/2016 | Gopal | H04W 40/246 | 370/316 |
| 2016/0098646 A1* | 4/2016 | Gomez | G06N 3/0454 | 706/12 |
| 2016/0294986 A1* | 10/2016 | Zhang | H04L 69/08 | |
| 2017/0083422 A1* | 3/2017 | Cheng | G06F 11/261 | |
| 2017/0207803 A1* | 7/2017 | Garrett | H04B 1/1027 | |
| 2018/0199166 A1* | 7/2018 | Park | H04B 1/385 | |
| 2018/0220489 A1* | 8/2018 | Lagnado | H04W 74/0833 | |
| 2018/0225230 A1* | 8/2018 | Litichever | G06F 21/56 | |
| 2018/0376338 A1* | 12/2018 | Ashrafi | H04L 67/10 | |
| 2019/0171722 A1* | 6/2019 | North | G06N 20/00 | |
| 2019/0372609 A1* | 12/2019 | Peng | H04B 7/0837 | |

* cited by examiner

SYSTEMS AND METHODS FOR IMPLEMENTING USER APPLICATIONS IN SOFTWARE-DEFINED RADIO DEVICES

BACKGROUND

The present disclosure generally relates to software-defined radio devices. More particularly, the present disclosure relates to systems and methods for implementing user applications in software-defined radio devices.

Software-defined radio devices can be used to implement some traditional hardware-based signal processing components, such as mixers, filters, amplifiers, modulators/demodulators, in software, rather than hardware. However, it can be difficult to effectively implement software-based signal processing while maintaining desired processing operations, such as conversion from analog to digital signals, at a high enough rate and with sufficient fidelity to enable effective software-based signal processing.

SUMMARY

In one aspect, the inventive concepts disclosed herein are related to a radio device. The radio device includes a hardware antenna, an analog-to-digital converter, one or more processors, and a memory device. The hardware antenna is configured to receive an analog signal corresponding to a radio frequency waveform. The analog-to-digital converter is configured to convert the analog signal to a digital signal corresponding to the radio frequency waveform. The memory device stores processor-readable instructions that when executed by the one or more processors, cause the one or more processors to provide the digital signal corresponding to the radio frequency waveform to a first application; execute the first application using the digital signal to generate a first output instruction; execute an application programming interface to convert the first output instruction to a second output instruction; and execute the second output instruction.

In a further aspect, the inventive concepts disclosed herein are related to a software-defined radio simulation system. The software-defined radio simulation system includes an antenna, an application, engine, and a simulation engine. The application engine is configured to execute first application by causing the first application to generate a first output instruction configured to control operation of the antenna. The simulation engine is configured to receive the first output instruction; generate a simulated response of the antenna to the first output instruction; responsive to the simulated response indicating an error condition, output the error condition; and responsive to the simulated response not indicating the error condition, cause the antenna to execute the first output instruction.

In a further aspect, the inventive concepts disclosed herein are related to a method. The method includes receiving, at a hardware antenna, an analog signal corresponding to a radio frequency waveform; converting, by an analog-to-digital converter, the analog signal to a digital signal corresponding to the radio frequency waveform; providing, by one or more processors, the digital signal to a first application stored in a memory device; executing, by the one or more processors, the first application using the digital signal to generate a first output instruction; executing, by the one or more processors, an application programming interface to convert the first output instruction to a second output instruction; and executing, by the one or more processors, the second output instruction.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for implementing user applications in software-defined radios. The inventive concepts disclosed herein can be utilized in various types of software-defined radio applications, such as for providing electronic communications in portable electronic devices. The inventive concepts disclosed herein can be utilized in various types of electronic avionics applications for airborne platforms (e.g., fixed wing aircraft, rotary wing aircraft), including but not limited to flight control and autopilot systems, navigation systems, flight display systems, communications systems, and radar systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a radio device, such as a software-defined radio device, includes a hardware antenna, an analog-to-digital converter, one or more processors, and a memory device. The hardware antenna is configured to receive an analog signal corresponding to a radio frequency waveform. The analog-to-digital converter is configured to convert the analog signal to a digital signal corresponding to the radio frequency waveform. The memory device stores processor-readable instructions that when executed by the one or more processors, cause the one or more processors to provide the digital signal corresponding to the radio frequency waveform to a first application; execute the first application using the digital signal to generate a first output instruction; execute an application programming interface to convert the first output instruction to a second output instruction; and execute the second output instruction.

Systems manufactured in accordance with the inventive concepts disclosed herein can improve operation of software-defined radios by enabling user applications to be developed that take advantage of the software-defined radio functions, such as by increasing a data transmission rate/data fidelity, and/or decreasing network traffic packet size, between the user applications and the software-defined radio functions, which can reduce latency. The execution of the user applications can be more secure, as the user applications will not be exposed to an external networking stack. The user applications, when executed, can access more detailed application programming interfaces, as the user applications allow higher levels of assurance. Size, weight, and power requirements can be reduced by hosting the user applications on the software-defined radio (while also ensuring security as described herein) by requiring fewer hardware components, particularly for space-constrained installations.

Figure 1:
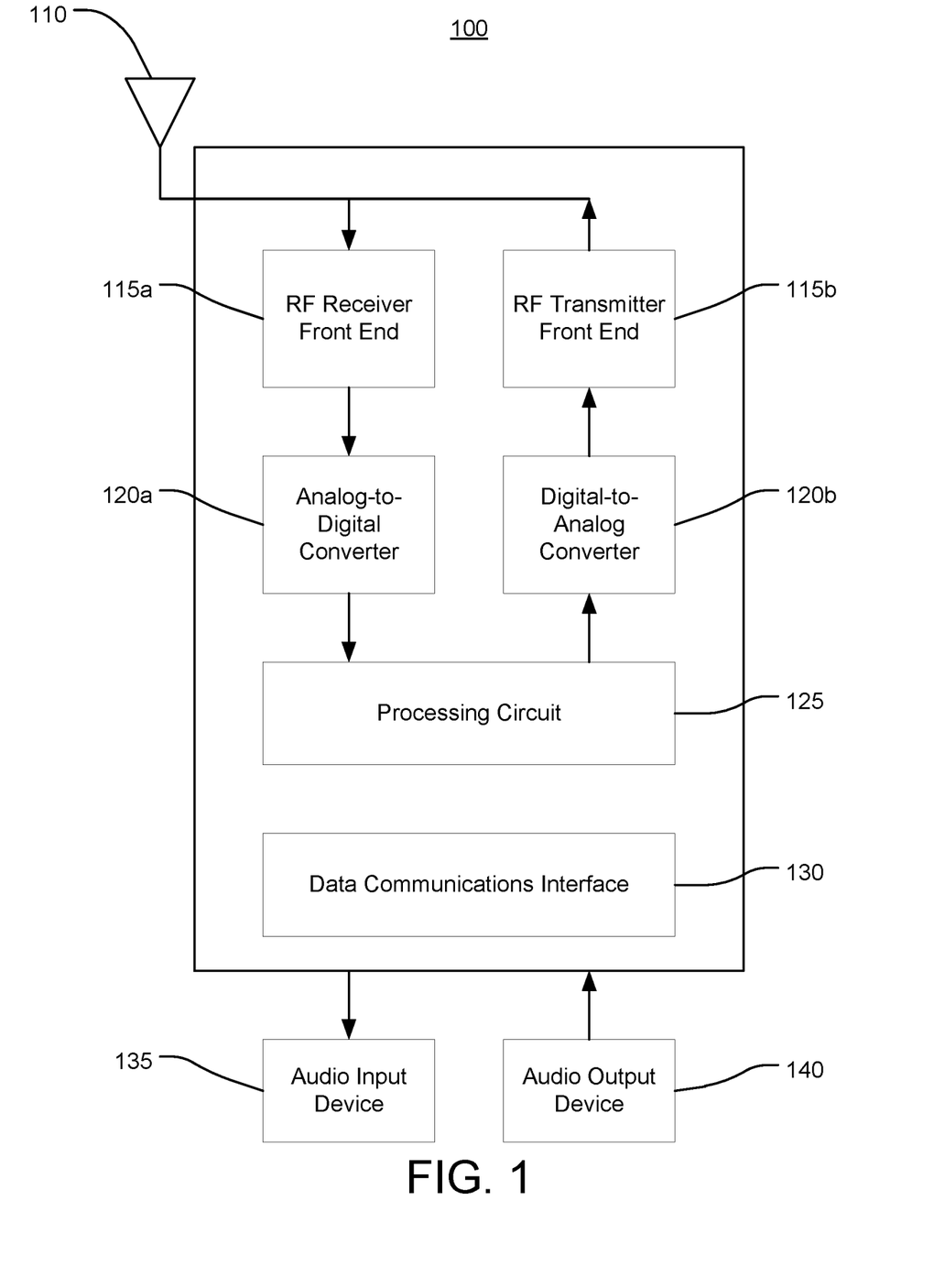
FIG. 1 is a block diagram of an exemplary embodiment of a software-defined radio according to the inventive concepts disclosed herein.

Referring now to FIG. 1, a software-defined radio device 100 is shown according to an exemplary embodiment of the inventive concepts disclosed herein. The software-defined radio device 100 includes an antenna 110. The antenna 110 can receive and transmit analog signals corresponding to radio frequency waveforms. The software-defined radio device 100 can include a plurality of antennas 110, each of which can receive/and or transmit analog signals corresponding to radio frequency waveforms. The antenna 110 can receive and/or transmit analog signals at a particular frequency. The antenna 110 can receive an analog signal corresponding to a radio frequency waveform, and provide the analog signal to an RF receiver front end 115a. The analog signal can be representative of the radio frequency waveform. The antenna 110 can receive an analog signal from an RF transmitter front end 115b and transmit a radio frequency waveform corresponding to the analog signal.

The radio frequency (RF) receiver front end 115a can perform various signal processing operations, such as filtering, amplification, local oscillation, or mixing. The radio frequency (RF) transmitter front end 115b can perform similar operations to prepare the analog signal for transmission by the antenna 110 as a radio frequency waveform.

The analog-to-digital converter 120a receives the analog signal corresponding to the radio frequency waveform (which was received by the antenna 110) and converts the analog signal to a digital signal. For example, the analog-to-digital converter 120a can sample the analog signal. As such, the analog-to-digital converter 120a can generate the digital signal to be representative of the radio frequency waveform of the analog signal.

The digital-to-analog converter 120b receives the digital signal corresponding to the radio frequency waveform (to be transmitted by the antenna 110) and converts the digital signal to an analog signal.

The software-defined radio 100 includes a processing circuit 125 that can implement the computational signal processing of signals received from and transmitted by the antenna 110, including but not limited to mixers, filters, amplifiers, and modulators/demodulators. The processing circuit 125 can define parameters for generating control signals that are used to control operation of the RF receiver front end 115a, the RF transmitter front end 115b, the analog-to-digital converter 120a, and the digital-to-analog converter 120b.

In some embodiments, the software-defined radio 100 includes a data communications interface 130, which may be distinct from the antenna 110. The data communications interface 130 can enable electronic communications to and from the software-defined radio 100 using various wired and/or wireless communication protocols, including but not limited to USB, Ethernet, WiFi, or Bluetooth protocols. In some embodiments, data representative of applications to be stored in and executed by the processing circuit 125 is received via the data communications interface 130 (e.g., from a processing circuit hosting a software development kit as discussed further herein with respect to FIG. 2).

In some embodiments, the software-defined radio 100 includes and/or is communicatively coupled to an audio output device 135. Similarly, the software-defined radio 100 can include and/or be communicatively coupled to an audio input device 140. The audio output device 135 can receive an audio waveform from the processing circuit 125, and can include an amplifier and speaker to output the audio waveform. The audio input device 140 can include a microphone and an amplifier to receive an audio waveform and provide the audio waveform to the processing circuit 125.

Figure 2:
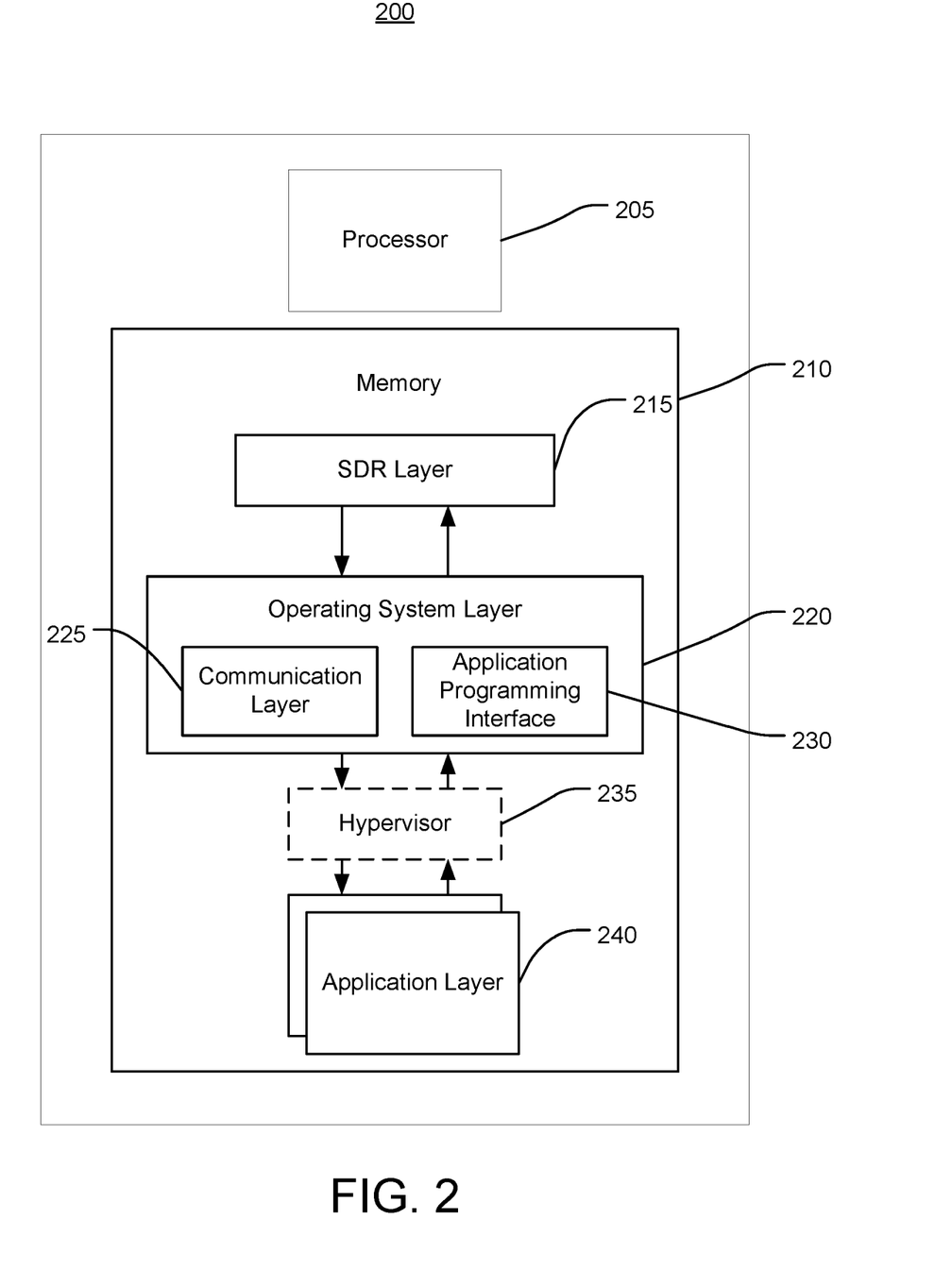
FIG. 2 is a block diagram of an exemplary embodiment of a processing circuit of the software-defined radio of FIG. 1 according to the inventive concepts disclosed herein.

Referring now to FIG. 2, a processing circuit 200 of a software-defined radio is shown according to an exemplary embodiment of the inventive concepts disclosed herein. The processing circuit 200 can be used to implement the processing circuit 125 of FIG. 1. The processing circuit 200 (or components thereof) can be implemented separately from the software-defined radio 100 of FIG. 1, such as to provide a software development kit (SDK) for developing user applications which may then be loaded into memory of processing circuit 125 of the software-defined radio 100, as discussed further below.

The processing circuit 200 includes a processor 205 and a memory 210. The processor 205 may be implemented as a specific purpose processor, an application specific integrated circuit (ASIC), one or more field programmable gate arrays (FPGAs), a group of processing components, or other suitable electronic processing components. The processor 205 may be a distributed computing system or a multi-core processor. The memory 210 is one or more devices (e.g., RAM, ROM, flash memory, hard disk storage) for storing data and computer code for completing and facilitating the various user or client processes, layers, and modules described in the present disclosure. The memory 210 may be or include volatile memory or non-volatile memory and may include database components, object code components, script components, or any other type of information structure for supporting the various activities and information structures of the inventive concepts disclosed herein. The memory 210 is communicably connected to the processor 205 and includes computer code or instruction modules for executing one or more processes described herein. The memory 210 can include various circuits, software engines, and/or modules that cause the processor to execute the systems and methods described herein. The memory may be distributed across disparate devices.

The memory 210 includes a software-defined radio (SDR) layer 215. The SDR layer 215 can receive data from and communicate data to applications of an application layer 240 via an operating system layer 220. The SDR layer 215 can execute various SDR signal processing functions, such as mixing, amplifying, and frequency modulation (e.g., to encode a digital signal for output by antenna 110).

In some embodiments, the SDR layer 215 includes a GPS module. The GPS module can receive radio frequency waveforms from a plurality of GPS/GNSS satellites, and calculate a position based on the received radio frequency waveforms.

The operating system layer 220 can include a portable operating system interface (PO SIX) operating system, such as Linux or Nucleus. The operating system layer 220 can include a communication layer 225 for communicating digital signals corresponding to radio frequency waveforms to the application layer 240. For example, the communication layer 225 can receive the digital signal corresponding to the radio frequency waveform (e.g., from the analog-to-digital converter 120a) and provide the digital signal to the application layer 240. As such, the applications of the application layer 240 can receive the digital signal more directly than if the applications were executed on a processing circuit outside of the software-defined radio, such as via a network via the data communications interface 130.

The operating system layer 220 includes an application programming interface 230. The application programming interface 230 can be used to convert executable instructions between application layer 240 and SDR layer 215. The application programming interface 230 can enable development of user applications (of application layer 240) that can receive data from and transmit data to the SDR layer 215. In some embodiments, the application programming interface 230 receives a first output instruction from an application of application layer 240 and converts the first output instruction to a second output instruction to be executed by the SDR layer 215. In some embodiments, using the application programming interface 230 to convert the first output instruction to the second output instruction can reduce the bandwidth In some embodiments, the application programming interface 230 includes a protocol converter. For example, for network-based waveforms, it may be desirable to convert between a proprietary application layer protocol to a standard protocol, such as XML protocol. As such, a software-defined radio implementing the application programming interface 230 can provide a single box solution to provide protocol compatibility. The application programming interface 230 can receive a first output instruction from an application of application layer 240, identify a first protocol of the first output instruction, retrieve a conversion corresponding to the first protocol, and execute the conversion to convert output instruction to a second protocol (e.g., to XML or other standard protocol).

In some embodiments, the application programming interface 230 includes or is implemented by a software development kit (SDK). The SDK can enable development of the applications of the application layer 240. The SDK can be remote from a software-defined radio (e.g., software-defined radio 100). For example, a processing circuit may be used to provide an application development environment using the SDK, so that an application can be developed using the SDK, and then loaded into the application layer 240 (e.g., via data communications interface 130 shown in FIG. 1).

The SDK can include a toolchain that produces binaries for a software-defined radio, such as for the SDR layer 215 of processing circuit 200. For example, the toolchain can process source code representative of an application to generate binaries for execution by the processing circuit 200, the binaries being compatible with the functions of the SDR layer 215. The binaries can be configured to interface with the SDR layer 215 directly or via the application programming interface 230. The SDK can include libraries to perform various functions of the processing circuit 200, such as functions of the operating system layer 220 (e.g., PO SIX libraries). The SDK can include libraries for executing radio-specific functions, such as control of discrete outputs (e.g., control of radio functions of SDR layer 215 for operation of antenna 110) or other human machine interfaces (e.g., processing of audio waveforms corresponding to audio output device 135 and/or audio input device 140). The SDK can include libraries for command/control signal processing of radio frequency waveforms associated with antenna 110.

The memory 210 includes an application layer 240 including one or more applications, such as software applications. The applications may be developed based on user instructions. By executing the applications of the application layer 240 using the processing circuit 200 (e.g., using the application programming interface 230), the applications can communicate more directly and at higher data transmission rates with the SDR layer 215 than in existing systems. For example, the time required for data transmissions between the SDR layer 215 and the application layer 240 can be significantly reduced. This can be particularly beneficial in a software-defined radio environment, in which the applications of the application layer 240 may be expected to execute signal processing operations on received waveforms (or generate digital signals use to output radio frequency waveforms) at high rates and with high fidelity. For example, referring back to FIG. 1 and further to FIG. 2, even if the analog-to-digital converter 120a can sample the analog signal from the antenna 110 at a sample rate sufficient to satisfy the Nyquist-Shannon sampling theorem, if the data transmission rate of the corresponding digital signal to the application layer 240 (e.g., directly or via SDR layer 215) is too low, then the applications of the application layer 240 may lose fidelity with respect to the analog signal and thus may generate errors in processing the analog signal. It will be appreciated that it can be technically challenging to develop the applications of the application layer 240 using embedded target toolchains; however, the present solution can overcome these challenges using a virtual machine or Docker image of the development environment, including using the SDK. Executing a virtual machine or Docker image by the processing circuit 200 to execute the user applications can increase security of the software-defined radio by hosting the user applications in the virtual machine or Docker image.

In some embodiments, the application layer 240 includes an audio processing application. The audio processing application can detect audio information in the digital signal corresponding to the radio frequency waveform, and execute one or more functions based on the detected audio information. In some embodiments, the audio processing application detects that the digital signal (e.g., the radio frequency waveform represented by the digital signal) includes audio information including a dual tone multi-frequency (DTMF) tone. The audio processing application can generate an output instruction based on the audio information, such as to control a discrete output, including to control a discrete output using the hardware antenna. The discrete output may include an output regarding compression or decompression of a radio frequency waveform.

In some embodiments, the application layer 240 includes a network filter application. The network filter application can receive information from the SDR layer 215 regarding a status of a network that the SDR layer 215 is in communication with, such as how many peers are on the network, or a classification of incoming network packets. For example, referring back to FIG. 1, the software-defined radio 100 can receive network communications via data communications interface 130. The network filter application can receive various operational parameters from the SDR layer 215, such as altitude, speed, or heading if the SDR layer 215 is in communication with sensors of an airborne platform or other platform. The network filter application can selectively filter data to be transmitted using antenna 110 based on the information received from the SDR layer 215, which can reduce total network bandwidth utilization. For example, the network filter application can filter network packets based on position or time (e.g., time of day). The network filter application can filter network packets based on a load on or bandwidth usage of the network.

In some embodiments, the processing circuit 200 includes a hypervisor 235. While FIG. 2 illustrates the hypervisor 235 as being implemented by memory 210, it will be appreciated that the hypervisor 235 can be a discrete hardware, software, or firmware component distinct from the memory 210 (the hypervisor 235 may also be implemented as part of the operating system layer 220). The hypervisor 235 can generate and execute one or more virtual machines. For example, the hypervisor 235 can generate and execute a virtual machine to execute one or more applications of the application layer 240.

Figure 3:
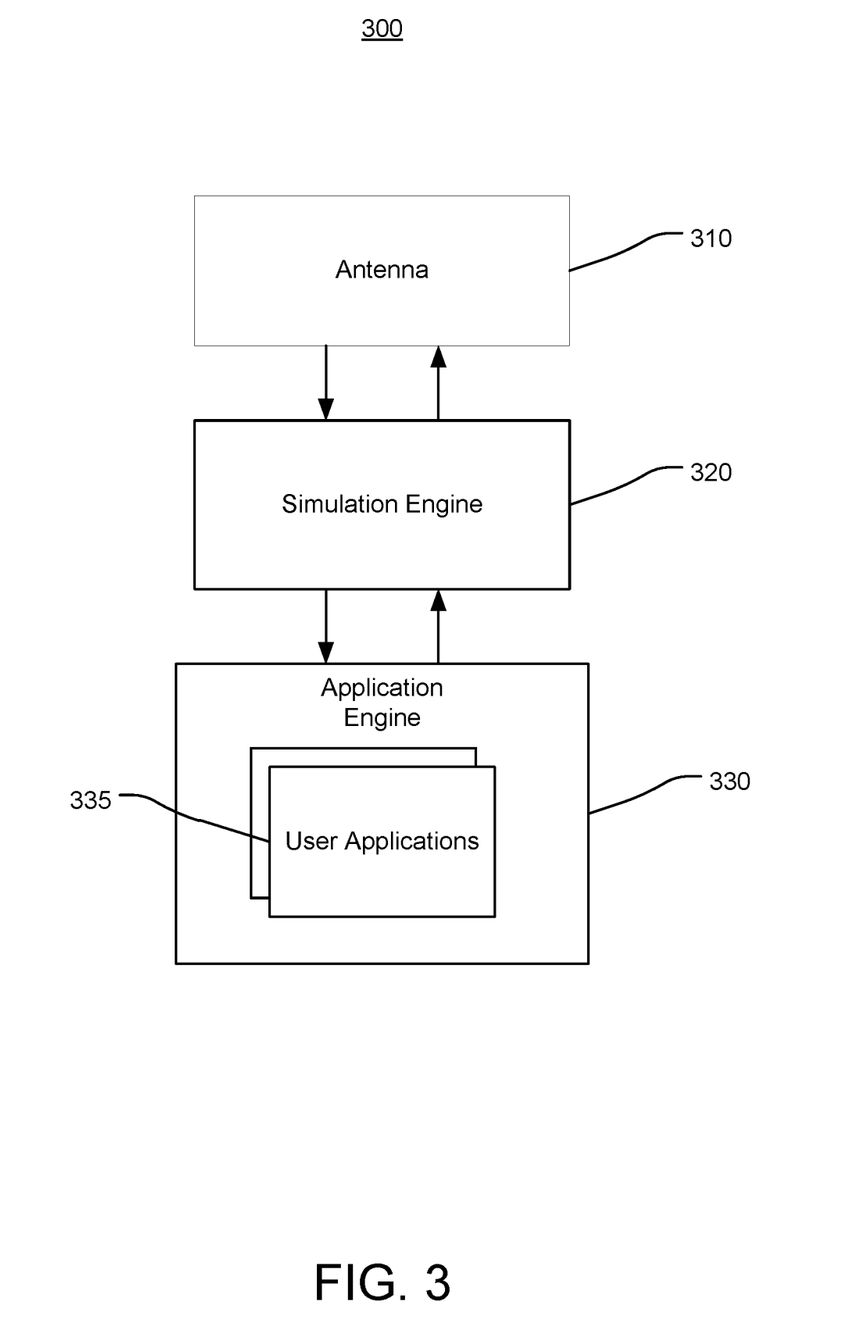
FIG. 3 is a block diagram of an exemplary embodiment of a software-defined radio simulation system according to the inventive concepts disclosed herein.

Referring now to FIG. 3, a software-defined radio simulation system 300 is shown according to an exemplary embodiment of the inventive concepts disclosed herein. The software-defined radio simulation system 300 can incorporate features of the software-defined radio 100 of FIG. 1 and the processing circuit 200 of FIG. 2. The software-defined radio simulation system 300 can provide a simulation environment for modeling and testing software-defined radio behavior and responses to instructions received from applications. The software-defined radio simulation system 300 includes a simulation engine 310 communicably coupled to an antenna 320 and an application engine 330.

In some embodiments, the simulation engine 310 includes hardware and/or software components analogous to those of the software-defined radio 100, such as analog to digital converters, digital to analog converters, mixers, modulators, or demodulators. The simulation engine 310 can receive data from such components (as well as the antenna 320) and convert the received data to an expected communication protocol as would be used by such components software-defined radio 100, such as expected frequencies, amplitudes, bit rates, or other such parameters. Similarly, the simulation engine 310 can In some embodiments, the antenna 320 is a hardware antenna that transmits and/or receives electromagnetic signals, such as radio frequency signals, similar to the antenna 110 described with reference to FIG. 1. As such, the antenna 320 can provide realistic antenna behavior to the simulation engine 310 and applications of the application engine 330.

In some embodiments, the antenna 320 is an antenna engine stored in a memory device and executed by one or more processors (e.g., the antenna 320 can be an antenna engine executed by a processing circuit similar to processing circuit 200). The antenna engine includes a model of a hardware antenna. The model of the hardware antenna can simulate a response of a hardware antenna to a driving signal. For example, the model of the hardware antenna can be used to calculate a frequency, amplitude, phase, or other parameter of a radio frequency signal outputted by the antenna 320 based on the driving signal.

In some embodiments, the model of the hardware antenna simulates the response of the hardware antenna to include an output of the hardware antenna. For example, the antenna 320 and/or the simulation engine 310 can be used to simulate a GPS/GNSS receiver, such as to generate a position outputted by the GPS/GNSS receiver or components thereof, such as parameters used in a GPS calculation relating to each satellite that a GPS/GNSS receiver would communicate with. The simulation engine 310 can provide the position to the application engine.

The application engine 330 includes one or more applications 335, such as user applications, that can receive data from and transmit data to the antenna 320 via the simulation engine 310. The application 335 can be executed to generate a first output instruction configured to control operation of the antenna 320. The simulation engine 310 can receive the first output instruction, and generate a simulated response of the antenna 320 to the first output instruction.

In some embodiments, the simulation engine 310 parses the first output instruction to determine an error condition when generating the simulated response of the antenna 320. For example, the simulation engine 310 can compare the first output instruction to one or more output instruction criteria, and responsive to the first output instruction satisfying the one or more output instruction criteria, the simulation engine 310 can provide the first output instruction to the antenna 320 to cause the antenna 320 to execute the first output instruction. Responsive to the first output instruction not satisfying the one or more output instruction criteria, the simulation engine 310 can output an error condition. As such, the behavior of a software-defined radio can be simulated while also enabling debugging and other improvement of the user applications 335.

Figure 4:
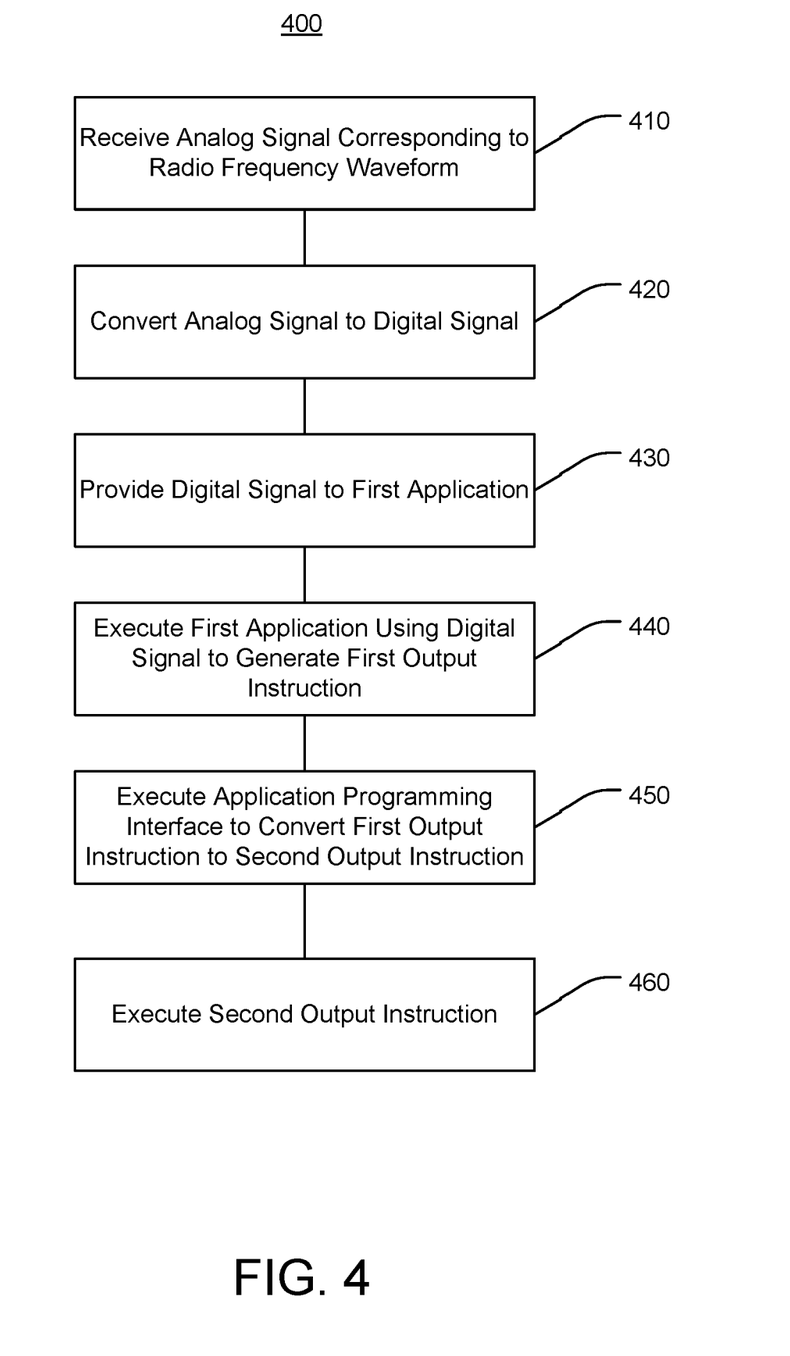
FIG. 4 is a flow chart of an exemplary embodiment of a method of implementing user applications in software-defined radio devices according to the inventive concepts disclosed herein.

Referring now to FIG. 4, a flow diagram of a method 400 of operating a software-defined radio device using user applications is shown according to the inventive concepts disclosed herein. The method can be performed by the software-defined radio device 100, the processing circuit 200, and/or the software-defined radio simulation system 300 described herein.

A step (410) may include receiving an analog signal corresponding to a radio frequency waveform at a hardware antenna. The hardware antenna can include a plurality of antennas, which may be configured to receive and/or transmit radio frequency waveforms at various frequencies.

A step (420) may include converting the analog signal to a digital signal corresponding to the radio frequency waveform, using an analog to digital converter. For example, the analog to digital converter can sample the analog signal.

A step (430) may include providing the digital signal to a first application stored in a memory device. In some embodiments, the memory device includes an operating system layer which provides the digital signal to the first application. The operating system can be a POSIX compliant operating system. In some embodiments, a hypervisor is stored in the memory device, and can be executed (by one or more processors) to isolate the first application.

A step (440) may include executing, by one or more processors, the first application using the digital signal to generate a first output instruction. In some embodiments, the first application can be executed to detect that the radio frequency waveform (corresponding to the digital signal) includes a DTMF tone. The first output instruction can be generated based on the DTMF tone to control a discrete output using the hardware antenna.

In some embodiments, the first application can be used to execute a network traffic filter. The network traffic filter can be used to selectively cause the hardware antenna to output transmissions. For example, the network traffic filter can be executed based on an indication of a state of the software-defined radio (or a platform coupled to the software-defined radio, such as an airborne platform).

In some embodiments, the first output instruction is generated based on a parameter received at the application programming interface. The parameter can include at least one of an altitude of an airborne platform, a speed of the airborne platform, or a position of the airborne platform.

A step (450) may include executing, by the one or more processors, an application programming interface to convert the first output instruction to a second output instruction. Converting the first output instruction to the second output instruction can include converting the first output instruction from a proprietary protocol to a non-proprietary protocol. The application programming interface can include or be implemented by an SDK.

A step (460) may include executing, by the one or more processors, the second output instruction. For example, executing the second output instruction can generate a transmission for output by the hardware antenna (or by another hardware antenna of the software-defined radio device).

As will be appreciated from the above, systems and methods for implementing user applications in software-defined radios according to embodiments of the inventive concepts disclosed herein may improve operation of software-defined radios by increasing the versatility of user applications, and increasing a data transmission rate/data fidelity, and/or decreasing network traffic packet size, between the user applications and the software-defined radio functions.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A radio device, comprising:
a hardware antenna configured to receive an analog signal corresponding to a radio frequency waveform;
an analog-to-digital converter configured to convert the analog signal to a digital signal corresponding to the radio frequency waveform;
one or more processors; and
a memory device storing processor-readable instructions that when executed by the one or more processors, cause the one or more processors to:
provide the digital signal corresponding to the radio frequency waveform to a first application stored within an application layer of the memory device;
execute the first application using the digital signal to generate a first output instruction, wherein generating the first output instruction comprises executing a network traffic filter based on an indication of state, the indication of state comprising at least one of an altitude of an airborne platform, a speed of the airborne platform, or a heading of the airborne platform;
execute an application programming interface to convert the first output instruction to a second output instruction, the application programming interface stored within an application programming interface layer of the memory device; and
execute the second output instruction by generating a transmission for output by the hardware antenna.

2. The radio device of claim 1, wherein the memory device stores a portable operating system interface (POSIX) compliant operating system for executing the second output instruction.

3. The radio device of claim 2, wherein the POSIX compliant operating system includes an application communication layer configured to receive the digital signal corresponding to the radio frequency waveform from the hardware antenna and provide the digital signal to the first application.

4. The radio device of claim 1, wherein the application programming interface is configured to convert the first output instruction to the second output instruction by converting the first output instruction from a proprietary protocol to a non-proprietary protocol.

5. The radio device of claim 1, wherein the first application is configured to detect that the radio frequency waveform includes a dual tone multi-frequency (DTMF) tone, and generate the first output instruction based on the DTMF tone to control a discrete output using the hardware antenna.

6. The radio device of claim 1, wherein the first application is configured to receive a parameter including a position of the airborne platform, via the application programming interface, and generate the first output instruction further based on the received parameter.

7. The radio device of claim 1, wherein the memory device stores a hypervisor configured to isolate the first application.

8. A method, comprising:
- receiving, at a hardware antenna, an analog signal corresponding to a radio frequency waveform;
- converting, by an analog-to-digital converter, the analog signal to a digital signal corresponding to the radio frequency waveform;
- providing, by one or more processors, the digital signal to a first application stored in a memory device;
- executing, by the one or more processors, the first application using the digital signal to generate a first output instruction by executing a network traffic filter based on an indication of state, the indication of state comprising at least one of an altitude of an airborne platform, a speed of the airborne platform, or a heading of the airborne platform;
- executing, by the one or more processors, an application programming interface to convert the first output instruction to a second output instruction, the application programming interface stored in the memory device; and
- executing, by the one or more processors, the second output instruction to generate a transmission for output by the hardware antenna.

9. The method of claim 8, wherein the memory device stores a portable operating system interface (POSIX) compliant operating system for executing the second output instruction.

10. The method of claim 9, wherein the POSIX compliant operating system includes an application communication layer, the method comprising providing the digital signal to the first application via the application communication layer.

11. The method of claim 8, wherein converting the first output instruction includes converting the first output instruction from a proprietary protocol to a non-proprietary protocol.

12. The method of claim 8, comprising detecting that the radio frequency waveform includes a dual tone multi-frequency (DTMF) tone, and generating the first output instruction based on the DTMF tone to control a discrete output using the hardware antenna.

13. The method of claim 8, further comprising receiving, at the first application via the application programming interface, a parameter including a position of the airborne platform, and generating the first output instruction further based on the received parameter.

14. The method of claim 8, further comprising executing, by the one or more processors, a hypervisor stored in the memory device to isolate the first application.

\* \* \* \* \*